US008589118B2

(12) United States Patent
Idemori et al.

(10) Patent No.: US 8,589,118 B2

(45) Date of Patent: Nov. 19, 2013

(54) CONVEYOR DIAGNOSTIC DEVICE AND CONVEYOR DIAGNOSTIC SYSTEM

(75) Inventors: Kimito Idemori, Saitama (JP); Takahiro Shirota, Fuchu (JP); Hiroyuki Kobayashi, Matsudo (JP); Katsuhiro Sumi, Hino (JP); Tomohiko Tanimoto, Tama (JP); Nobutaka Nishimura, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 554 days.

(21) Appl. No.: 12/917,040

(22) Filed: Nov. 1, 2010

(65) Prior Publication Data

US 2011/0106490 A1 May 5, 2011

(30) Foreign Application Priority Data

Nov. 4, 2009 (JP) ................................ 2009-253493

(51) Int. Cl.
*G01C 9/00* (2006.01)
*G06F 15/00* (2006.01)

(52) U.S. Cl.
USPC .......................................... 702/154; 702/151

(58) Field of Classification Search
USPC ............ 702/92, 94, 150, 151, 154, 183, 185, 702/189; 198/301, 313, 314; 356/614, 606
See application file for complete search history.

(56) References Cited

FOREIGN PATENT DOCUMENTS

| | | |
|---|---|---|
| JP | 2007-8709 | 1/2007 |
| JP | 4020204 | 10/2007 |
| JP | 2008-195481 A * | 8/2008 |
| JP | 4305342 | 5/2009 |
| JP | 2009-215010 | 9/2009 |

* cited by examiner

*Primary Examiner* — John H Le
(74) *Attorney, Agent, or Firm* — Finnegan, Henderson, Farabow, Garrett & Dunner, LLP

(57) ABSTRACT

According to one embodiment, a conveyor diagnostic device diagnoses an abnormal state of a cyclically moving conveyor. The conveyor diagnostic device includes a first tilt sensor, a second tilt sensor, a table, and a processing unit. The first and second tilt sensors are attached to a predetermined position of the conveyor and detect tilt angles of the conveyor in a vertical direction and horizontal direction, respectively. The table indicates a relationship between a tilt angle which changes in the vertical direction and sections included in one revolution of the conveyor. The processing unit specifies an abnormality occurrence position of the conveyor based on a tilt angle in the vertical direction, the table, and an elapsed time after ingression for a section corresponding to the tilt angle in the vertical direction, when a tilt angle in the horizontal direction exceeds a predetermined management limit value.

8 Claims, 10 Drawing Sheets

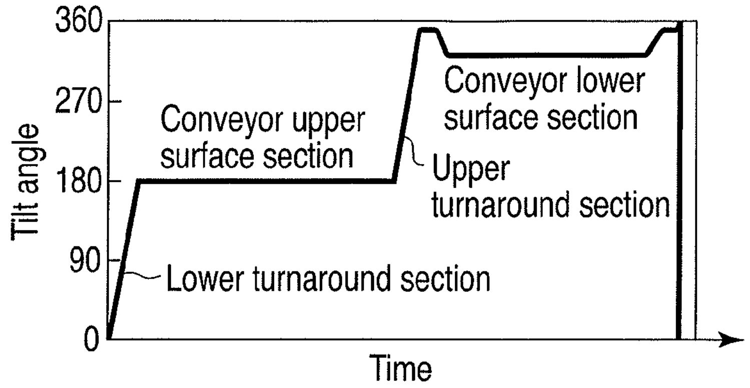
FIG. 3
| Vertical tilt angle | Specific step position (section) |
|---|---|
| 0 ~ 180° | Lower turnaround section |
| 180° | Conveyor upper surface section |
| 180 ~ 360° | Upper turnaround section |
| 330° | Conveyor lower surface section |
FIG. 4
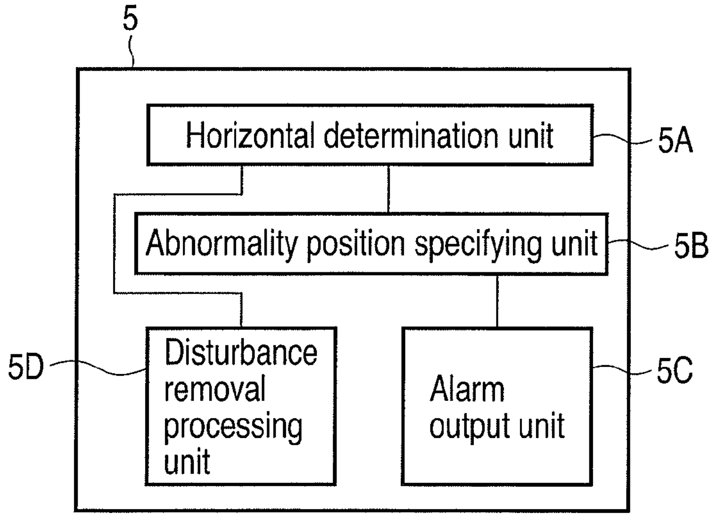
FIG. 5

3-2

| Vertical tilt angle | Specific step position (section) | Traveling time |
|---|---|---|
| 0 ~ 180° | Lower turnaround section | T1 |
| 180° | Conveyor upper surface section | T2 |
| 180 ~ 360° | Upper turnaround section | T3 |
| 330° | Conveyor lower surface section | T4 |

Tilt angle change point

T2

| Elapsed time | t1 | t2 | t3 | ------------ | t (n-1) | tn |
|---|---|---|---|---|---|---|
| Individual position | Surface a1 | Surface a2 | Surface a3 | ------------ | Surface a (n-1) | Surface an |

3-2b

CONVEYOR DIAGNOSTIC DEVICE AND CONVEYOR DIAGNOSTIC SYSTEM

CROSS-REFERENCE TO RELATED APPLICATIONS

This application is based upon and claims the benefit of priority from Japanese Patent Application No. 2009-253493, filed Nov. 4, 2009; the entire contents of which are incorporated herein by reference.

FIELD

Embodiments described herein relate generally to a conveyor diagnostic device and conveyor diagnostic system which diagnose the state of a conveyor which conveys passengers.

BACKGROUND

A conventional conveyor diagnostic device as a first example has an acceleration sensor attached to a back side of a specific step, of a conveyor constituted by a plurality of steps coupled in an endless manner, in a direction to obtain sensitivity in a vertical direction. The conveyor diagnostic device as the first example acquires vibration data from the acceleration sensor and corresponding measurement times. Based on the acquired vibration data, the conveyor diagnostic device as the first example sets, as a reference time, a time when the specific step passes through a conveyor turnaround section at which plus or minus of an acceleration reverses, and compares vibration data from the acceleration sensor during the circulatory movement of the conveyor with vibration data during normal operation. Upon determining that there is an abnormal vibration, the conveyor diagnostic device as the first example measures an elapsed time from the reference time, and specifies an abnormality occurrence position (e.g., Japanese Patent No. 4020204).

A conventional conveyor diagnostic device as a second example has two acceleration sensors attached to a middle portion of a back side of a specific step, of steps coupled in an endless manner, to detect accelerations in a lateral widthwise direction and a horizontal movement direction. Accelerations detected by these acceleration sensors are sent to a signal processor. The signal processor includes a step position specifying unit, to specify, from outputs from the acceleration sensors, a passenger carrying/movement section, a turnaround section in which no passenger is mounted, and a deadhead section from the turnaround section to the passenger carrying/movement section. The signal processor includes an abnormality detection unit to detect an abnormality in the acceleration acting on the conveyor, based on outputs from the step position specifying unit and the acceleration sensors (e.g., Japanese Patent No. 4305342).

A conventional conveyor diagnostic device as a third example has an acceleration sensor and microphone attached to a middle portion of a back side of a specific step of steps coupled in an endless manner. The conveyor diagnostic device as the third example converts vibration signals and sound signals obtained from the acceleration sensor and the microphone into digital data, and stores the digital data in an information storage device. A processor specifies outward and return sections from the stored vibration signals. Based on the specified outward section/return section information, the processor extracts an average amplitude, kurtosis, and periodic component of the stored vibration and sound signals as statistical feature amounts, compares the statistical feature amounts with preset feature amounts, and determines a presence/absence of an abnormality in the conveyor (for example, Jpn. Pat. Appln. KOKAI Publication No. 2007-8709).

The conventional conveyor diagnostic devices as the first to third examples described above each are attached with an acceleration sensor or sensors and specify an abnormality occurrence position by using the vibration signal or signals obtained from the acceleration sensor or sensors.

According to the conventional techniques as the first and second examples, Relationships between elapsed times after identification of a conveyor turnaround section and step positions is set in a table in advance. Upon determining the presence of an abnormal vibration from vibration data of the acceleration sensor, each devices refers to the table to specify an abnormality occurrence position on the conveyor from the elapsed time after identification of a conveyor turnaround section.

In this manner, an abnormality occurrence position is specified from the elapsed time after identification of a conveyor turnaround section which is obtained from an output from the acceleration sensor. If, however, the step to which the acceleration sensor is attached passes near a conveyor turnaround section, passengers frequently ride on and off the conveyor. For this reason, low-frequency disturbance vibrations tend to occur.

As a result, low-frequency disturbances mix in a sensor output at the turnaround timing of the step to which the acceleration sensor is attached. This may lead to a reduction in the accuracy of turnaround identification and difficulty in identifying a turnaround.

In addition, when the conveyor runs at variable speeds or the running speed of the conveyor changes due to a failure in a conveyor driving unit, using the conventional techniques as the first to third examples may lead to a great reduction in the accuracy of specifying an abnormality occurrence position. Furthermore, the third conventional example is configured to specify the outward and return sections of the conveyor based on the identification timing of a conveyor turnaround section. If, however, the conveyor is long, an error in specifying an abnormality occurrence position may increase.

BRIEF DESCRIPTION OF THE DRAWINGS

FIG. 3 is a graph showing a relationship between elapsed times, vertical tilt angles, and positions (sections) of the conveyor;

FIG. 4 is a view showing an example of a tilt angle/position table in a set data memory used in the first embodiment;

FIG. 5 is a block diagram showing an example of a signal processing unit shown in FIG. 1;

DETAILED DESCRIPTION

Figure 1:
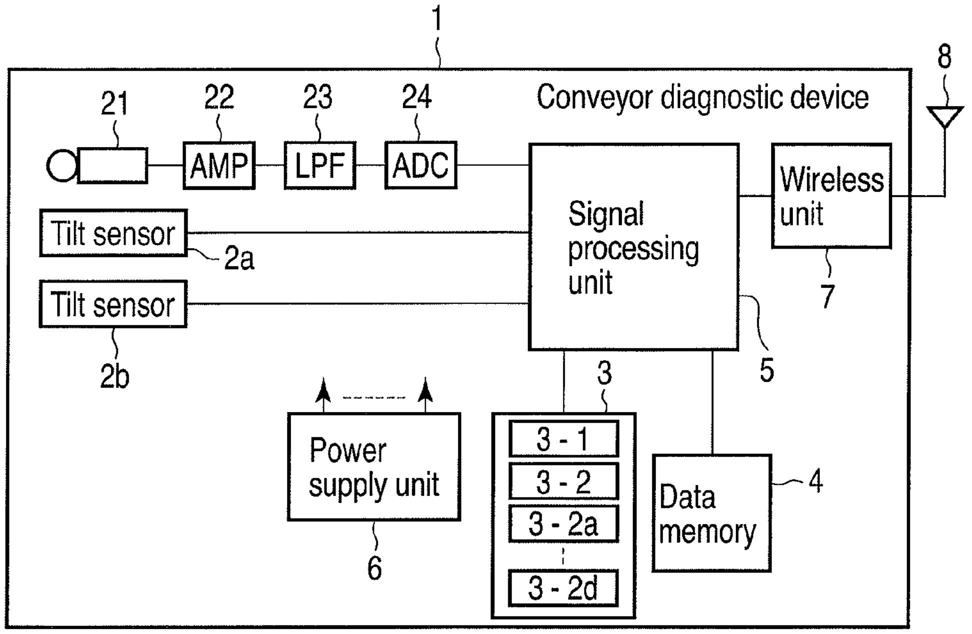
FIG. 1 is a block diagram showing an example of a structure of a conveyor diagnostic device according to a first, second and third embodiment.

In general, according to embodiments, a conveyor diagnostic device diagnoses an abnormal state of a cyclically moving conveyor. The conveyor diagnostic device includes a first tilt sensor, a second tilt sensor, a table, and a signal processing unit. The first tilt sensor is attached to a predetermined position of the conveyor and detects a tilt angle of the conveyor in a vertical direction. The second tilt sensor is attached to a predetermined position of the conveyor and detects a tilt angle of the conveyor in a horizontal direction. The table indicates a relationship between a tilt angle which changes in the vertical direction and a plurality of sections included in one revolution of the conveyor to which the first tilt sensor and the second tilt sensor are attached. The signal processing unit specifies an abnormality occurrence position of the conveyor based on a tilt angle in the vertical direction detected by the first tilt sensor, the table, and an elapsed time after ingression for a section corresponding to the tilt angle in the vertical direction, when a tilt angle in the horizontal direction detected by the second tilt sensor exceeds a predetermined management limit value.

Embodiments will be explained below with reference to accompanying drawings. In the drawings, the same reference numbers and symbols denote the same or substantially same elements, and a description thereof will be omitted or briefly described. Only different parts will be explained in detail.

(First Embodiment)

FIG. 1 is a block diagram showing an example of a structure of a conveyor diagnostic device according to a first embodiment.

A conveyor diagnostic device 1 includes a plurality of tilt sensors 2*a* and 2*b*, a set data memory 3, a data memory 4, a signal processing unit 5, a power supply unit 6 such as a battery, a wireless unit 7, and a transmission/reception antenna 8.

Figure 2:
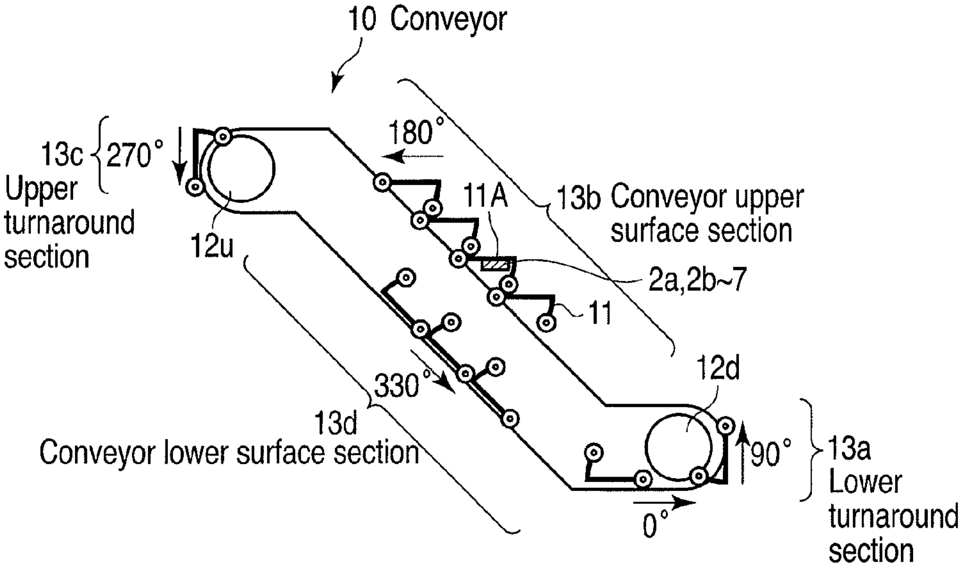
FIG. 2 is a side view showing an example of changing of a tilt angle in a vertical direction obtained by one revolution of a conveyor with a tilt sensor.

As shown in FIG. 2, the tilt sensors 2*a* and 2*b* are attached to, for example, a back side of a specific step 11A of a plurality of steps 11 constituting a conveyor 10 and coupled in an endless manner. As the tilt sensor 2*a*, a digital sensor to detect a tilt angle within a range of 360° in a vertical direction is used. However, for example, an analog tilt sensor may be used.

As the tilt sensor 2*b*, a digital sensor is used, which detects a tilt angle within an angle range in a horizontal direction, which is required to determine a conveyor abnormality. However, as in the case with the tilt sensor 2*a*, an analog type tilt sensor may be used.

Note that when the analog type tilt sensors 2*a* and 2*b* are to be used, it is necessary to connect at least low-pass filters and A-D conversion circuits to output sides of the analog type tilt sensors 2*a* and 2*b* and convert signals from the sensors into signals that can be digitally processed.

Every time the conveyor 10 makes one revolution, the specific step 11A to which the tilt sensors 2*a* and 2*b* are attached makes one rotation in the vertical direction and returns to the initial position. This step repeats this operation. That is, assuming that the tilt angle of the specific step 11A is 0° immediately before it turns around a lower bottom portion of a lower sprocket 12*d*, the tilt angle of the specific step 11A changes between 0°, 90°, and 180° in the vertical direction as the specific step 11A turns around a lower turnaround section (area) 13*a* defined by the lower sprocket 12*d*, and the specific step 11A shifts to a conveyor upper surface section 13*b*.

The specific step 11A moves toward an upper sprocket 12*u* in the conveyor upper surface section 13*b* while maintaining a tilt angle of 180°. As the specific step 11A turns around an upper turnaround section 13*c* defined by the upper sprocket 12*u*, the tilt angle of the specific step 11A changes between 180°, 270°, and nearly 360° in the vertical direction, and the specific step 11A shifts to a conveyor lower surface section 13*d*. In the conveyor lower surface section 13*d*, the tilt angle of the specific step 11A becomes 330°, and the specific step 11A makes one rotation immediately before the lower bottom portion of the lower sprocket 12*d*. As a result, the tilt angle becomes 360°=0°. That is, the tilt angle returns to 0°.

Assume that an abscissa represents an elapsed time taken for the specific step 11A to make one revolution, and an ordinate represents the vertical tilt angle. In this case, the tilt sensor 2*a* outputs a tilt angle as shown in FIG. 3 for each section that changes according to one revolution of the conveyor 10.

A tilt angle/position table 3-1 (see FIG. 4) and upper and lower management limit value data (see FIG. 7) are set in the set data memory 3.

A relationship between vertical tilt angles and positions (sections: lower turnaround section, conveyor upper surface section, upper turnaround section, and conveyor lower surface section) of the specific step 11A is set in the tilt angle/position table 3-1. When, for example, the specific step 11A rotates around the lower turnaround section 13*a* and reaches 180°, it can be recognized, based on the tilt angle/position table 3-1, that the specific step 11A is located in the conveyor upper surface section 13*b*. Furthermore, it is possible to specify a position of the specific step 11A based on an elapsed time and speed shown in FIG. 3 after the tilt angle has reached 180°.

The data memory 4 stores the tilt angles detected by the tilt sensors 2*a* and 2*b* and various kinds of processed data.

The signal processing unit 5 executes predetermined processing in accordance with, for example, a preset processing program. As shown in FIG. 5, the signal processing unit 5 functionally includes a horizontal determination unit 5A, an abnormality position specifying unit 5B, an alarm output unit 5C, and a disturbance removal processing unit 5D.

The horizontal determination unit 5A executes a horizontal tilt angle deviation determination. The horizontal determination unit 5A has a function of comparing the horizontal tilt angle detected by the tilt sensor 2*b* with the upper and lower management limit values (see FIG. 7) set in the set data memory 3 (which may also be set in the data memory 4), and determining whether the horizontal tilt angle exceeds the upper or lower management limit value.

The abnormality position specifying unit 5B executes an abnormality occurrence position specifying. If the tilt angle detected by the tilt sensor 2*b* exceeds the upper or lower management limit value, the abnormality position specifying unit 5B specifies an abnormality occurrence position by referring to the tilt angle/position table 3-1 or the like in the set data memory 3.

The alarm output unit 5C outputs an abnormality alarm in accordance with a predetermined processing procedure based on, for example, an alarm output flag.

The disturbance removal processing unit 5D can estimate a next vertical tilt angle of the specific step 11A which changes according to the circulatory movement of the specific step 11A. If the tilt angle changes to a different angle, the disturbance removal processing unit 5D determines that an angle change has occurred due to the occurrence of a disturbance, and performs processing of correcting the tilt angle data of the tilt sensor 2*a* stored in the data memory 4 to the tilt angle data before the change or replacing the tilt angle data with disturbance occurrence data.

As the power supply unit 6, for example, a battery power supply is used. The power Supply unit 6 supplies power to the constituent elements 2*a*, 2*b*, 3, 4, 5, and 7 included in the conveyor diagnostic device 1.

The wireless unit 7 is used to transmit and receive data to and from, for example, an external monitoring device.

Note that the constituent elements 2*a* and 2*b* to 8 included in the conveyor diagnostic device 1 are attached together to a back side of the specific step 11A. It is, however, possible to attach, for example, only the tilt sensors 2*a* and 2*b* to the back side of the specific step 11A and mount the signal processing unit 5 including the memories 3 and 4 on another proper portion, e.g., a next step 11, so as to transmit and receive signals between the tilt sensors 2*a* and 2*b* and the signal processing unit 5.

Figure 6:
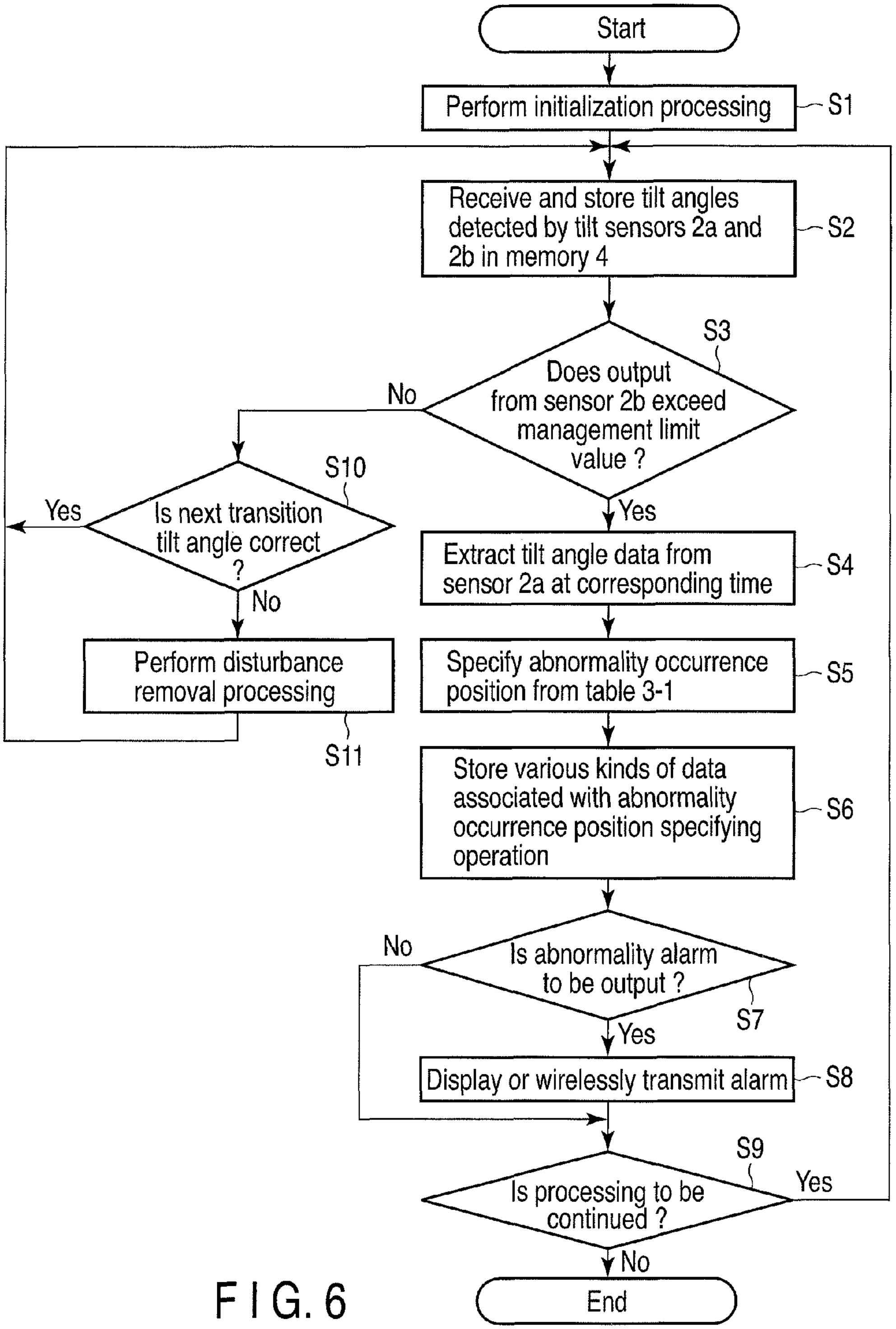
FIG. 6 is a flowchart showing an example of an operation of the signal processing unit shown in FIG. 1.

An operation of the conveyor diagnostic device 1 having the above structure will be described next with reference to FIG. 6.

The conveyor diagnostic device 1 executes initialization processing of erasing unnecessary data upon starting operation (S1). The conveyor diagnostic device 1 then executes the horizontal determination unit 5A and causes the conveyor 10 to circulate.

The horizontal determination unit 5A acquires data including the vertical and horizontal tilt angles of the specific step 11A which are detected by the tilt sensors 2*a* and 2*b* attached to the specific step 11A and sequentially stores the data in the data memory 4 (S2). The horizontal determination unit 5A also determines whether the horizontal tilt angle exceeds upper or lower management limit value 14*u* or 14*d* shown in FIG. 7 (S3).

Figures 7, 8, 9:
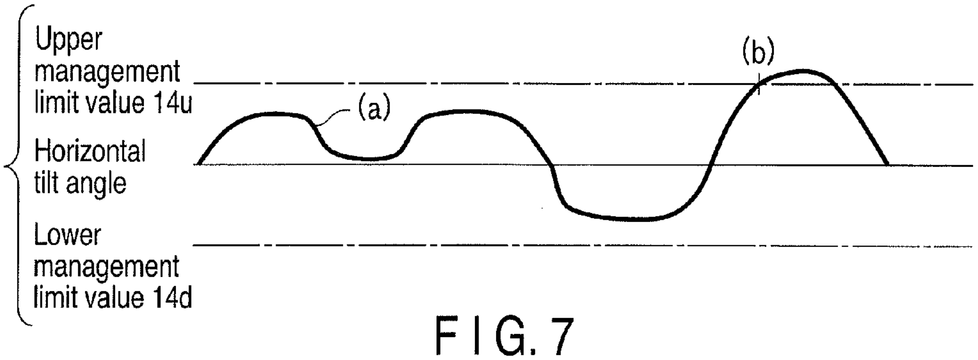
FIG. 7 is a chart showing an example of a relationship between horizontal tilt angles of the conveyor to which a tilt sensor is attached and upper and lower management limit values for a determination of an occurrence of an abnormality.
FIG. 8 is a view showing an example of a section/movement time table in a set data memory used in the second embodiment.
FIG. 9 is a view showing an example of an elapsed time/position table corresponding to a section in the set data memory used in the second embodiment.

As the conveyor 10 circulates, the specific step 11A may move as slightly tilting in the horizontal (lateral) direction before, for example, an abnormality occurs, as indicated by (a) in FIG. 7. As a result, if the horizontal tilt angle falls within an allowable angle range, the horizontal determination unit 5A determines that there is no problem. However, the horizontal determination unit 5A determines an occurrence of an abnormality on the conveyor 10 at the timing indicated by (b) in FIG. 7 when the horizontal tilt angle which is detected by the tilt sensor 2*b* exceeds the upper or lower management limit value 14*u* or 14*d*, and executes the abnormality position specifying unit 5B.

The abnormality position specifying unit 5B extracts vertical tilt angle data detected by the tilt sensor 2*a* which is acquired at the time indicated by (b) in FIG. 7 (S4). The abnormality position specifying unit 5B refers to the tilt angle/position table 3-1 in the set data memory 3 to estimate a section position of the specific step 11A (for example, in the conveyor upper surface section 13*b*), and also estimates a elapsed time (at a constant speed) from the time corresponding to the initial position of the specific step 11A in the conveyor upper surface section 13*b* at which the tilt angle has changed to 180° based on, for example, the basic pattern based on FIG. 3. The abnormality position specifying unit 5B then specifies an abnormality occurrence position on the conveyor 10 (S5).

Upon specifying the abnormality occurrence position on the conveyor 10, the abnormality position specifying unit 5B acquires and stores various kinds of data associated with the abnormality occurrence position in a predetermined area of the data memory 4 (S6). The data to be stored includes, for example, the horizontal tilt angle detected by the tilt sensor 2*b* at the time of the occurrence of an abnormality, the limit value 14*d* or 14*u* which the horizontal tilt angle has exceeded, the vertical tilt angle detected by the tilt sensor 2*a*, the elapsed time since a tilt angle change point, and the abnormality occurrence position.

Subsequently, the alarm output unit 5C determines whether to output an abnormality alarm (S7). If a flag to output an alarm is set, the alarm output unit 5C performs blinking display or color switching display or displays acquired data associated with the occurrence of the abnormality on the display unit (not shown) of the conveyor diagnostic device 1. If the alarm output unit 5C is wirelessly connected to an external monitoring device, the alarm output unit 5C wirelessly transmits abnormality alarm information (S8) to the external monitoring device. When the processing is to be continued (S9), the process shifts to step S2 to repeatedly execute similar processing.

Upon determining in step S3 that the horizontal tilt angle does not exceed the upper and lower management limit values 14*u* and 14*d*, the horizontal determination unit 5A executes the disturbance removal processing unit 5D.

The disturbance removal processing unit 5D determines, based on the vertical tilt angle data acquired from the tilt sensor 2*a*, whether the next change in tilt angle is correct, i.e., whether any disturbance has occurred (S10). For example, when the specific step 11A passes through the upper turnaround section 13*c*, the tilt angle shifts to 180°, −270°, and nearly −360°. Near the upper turnaround section 13*c*, a passenger rides off the specific step 11A or rushes up from the lower steps 11 onto the specific step 11A and steps down on the upper floor. This causes a disturbance. As a consequence, upon acquiring tilt angle data different from the tilt angle estimated based on the tilt angle/position table 3-1 from the tilt sensor 2*a* (if the difference between the vertical tilt angle acquired from the tilt sensor 2*a* and an estimated tilt angle are exceeds a predetermined range), the disturbance removal processing unit 5D determines an occurrence of a disturbance, and, for example, performs disturbance removal processing by correcting the tilt angle data from the tilt sensor 2*a* into the tilt angle data before the change (S11).

According to the embodiment described above, therefore, if the horizontal tilt angle detected by the tilt sensor 2*b* exceeds the upper or lower management limit values 14*u* or 14*d*, it is possible to refer to the tilt angle/position table 3-1 based on the vertical tilt angle detected by the tilt sensor 2*a* and specify a position on the conveyor 10, e.g., a specific position on a guide rail of an escalator, at which an abnormality has occurred.

In addition, the tilt angle changes between 0° and 180° in the lower turnaround section 13*a*, remains 180° in the conveyor upper surface section 13*b*, changes between 180° and nearly 360° in the upper turnaround section 13*c*, and remains to 330° in the conveyor lower surface section 13*d*. It is, therefore, possible to estimate the tilt angle to which the current tilt angle shifts next. If a different tilt angle is detected, the processing can be performed assuming that a disturbance has occurred.

(Second Embodiment)

The second embodiment uses a conveyor diagnostic device 1 which is similar to that shown in FIG. 1. Therefore, the same reference numerals as in FIG. 1 denote the same components, and a description will not be repeated.

In the conveyor diagnostic device 1 according to the second embodiment, a set data memory 3 newly includes a section-specific movement time table 3-2 and elapsed time/position tables 3-2*a* to 3-2*d* corresponding to the respective sections in place of the tilt angle/position table 3-1.

As shown in FIG. 8, the section-specific movement time table 3-2 associates the vertical tilt angles, the respective positions (sections), and the movement times at the respective positions (sections). That is, the movement times linked to the section-specific movement time table 3-2 include a time T1 required for the specific step 11A to move in the lower turnaround section, a time T2 required for the specific step 11A to move in the conveyor upper surface section, a time T3 required for the specific step 11A to move in the upper turnaround section, and a time T4 required for the specific step 11A to move in the conveyor lower surface section.

As shown in FIG. 9, for example, the individual positions a1, . . . , an in the conveyor upper surface section are corresponded to elapsed times t1, . . . , to from a angle change point (tilt angle transition point) in the elapsed time/position table 3-2*b* for the conveyor upper surface section 13*b*. The other elapsed time/position tables 3-2*a*, 3-2*c* and 3-2*d* include same items as the conveyor upper surface section 13*b*, respectively.

In the second embodiment, The abnormality position specifying unit 5B, in particular, is improved. That is, when the horizontal determination unit 5A determines that the horizontal tilt angle exceeds an upper or lower management limit value 14*u* or 14*d*, the abnormality position specifying unit 5B refers to the section-specific movement time table 3-2, based on the vertical tilt angle detected by the tilt sensor 2*a* and stored in the data memory 4, to determine the specific section in which the horizontal tilt angle of the specific step 11A exceeds the upper or lower management limit value 14*u* or 14*d*.

The movement time required for the specific step 11A to pass through each section, for example, the time required for the specific step 11A to move in the conveyor upper surface section 13*b*, is the time T2. For this reason, after the above operation, the abnormality position specifying unit 5B refers to the elapsed time/position table 3-2*b*, in which the movement time T2 is set, to find out the elapsed time (for example, t3) from a tilt angle transition point)(180°). The abnormality position specifying unit 5B then specifies a mechanical portion of a conveyor 10 (in the second embodiment, for example, a guide rail of the escalator) in which an abnormality has occurred, based on the individual position a3 in a conveyor upper surface section 13*b*.

In this embodiment, therefore, upon determining that the horizontal tilt angle exceeds the upper or lower management limit value 14*u* or 14*d*, the conveyor diagnostic device 1 accurately specifies an abnormality occurrence position from, for example, detailed data of elapsed times/individual positions in the elapsed time/position table 3-2*b* corresponding to an abnormality detection section, based on the tilt angle change point in vertical tilt angle detected by the tilt sensor 2*a*.

In addition, this embodiment determines tilt angles that change in the respective sections including a lower turnaround section 13*a*, a conveyor upper surface section 13*b*, an upper turnaround section 13*c*, and a conveyor lower surface section 13*d*. This makes it possible to easily estimate a tilt angle to which the current tilt angle changes next. If, therefore, a different tilt angle is detected, the subsequent processing can be performed assuming that a disturbance has occurred.

Furthermore, since the movement time of the specific step 11A is determined in each section, when an actual movement time of the conveyor 10 greatly differs from a predetermined movement time (a difference between the actual movement time and the predetermined movement time is exceeds a predetermined allowable range), it is possible to detect a speed abnormality in the conveyor driving unit in the corresponding section.

(Third Embodiment)

The third embodiment newly includes a function of acquiring sound generated by the conveyor 10 and specifying an abnormality portion on the conveyor 10 from the level of the acquired sound, in addition to the constituent elements 2*a* and 2*b* to 8 described in the first and second embodiments. The same reference numerals as those of the components already described above denote the same components in the third embodiment, and a description will not be repeated. Different components will be described below.

As shown in FIG. 1, the conveyor diagnostic device 1 includes a microphone 21 attached to a specific step 11A. The conveyor diagnostic device 1 excludes an accidental disturbance based on sound acquired for a predetermined number of revolutions of the conveyor 10 and accurately detects an abnormality occurrence position.

The microphone 21 attached to the specific step 11A is connected via an amplifier 22, a low-pass filter 23, and an A/D converter 24 to the signal processing unit 5.

Figure 10:
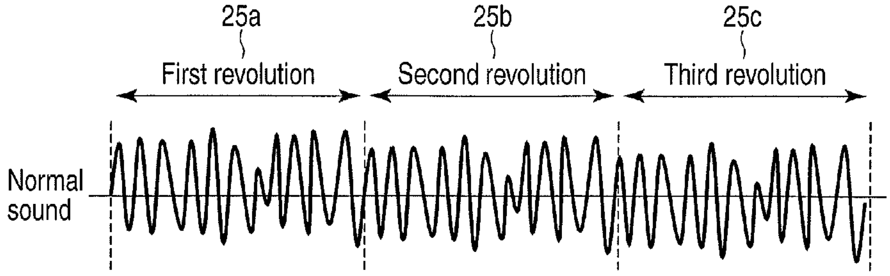
FIG. 10 is a graph showing an example of a changing state of a normal sound level throughout the predetermined number of revolutions during normal conveyor operation in a conveyor diagnostic device according to the third embodiment.

The set data memory 3 or the data memory 4 stores a normal sound signal shown in FIG. 10 acquired by the microphone 21 for a predetermined number of revolutions (for example, three revolutions) of the conveyor 10 during normal operation. In practice, the set data memory 3 or the data memory 4 memory stores a normal sound, level signal having undergone digital conversion by the A/D converter 24.

Figure 11:
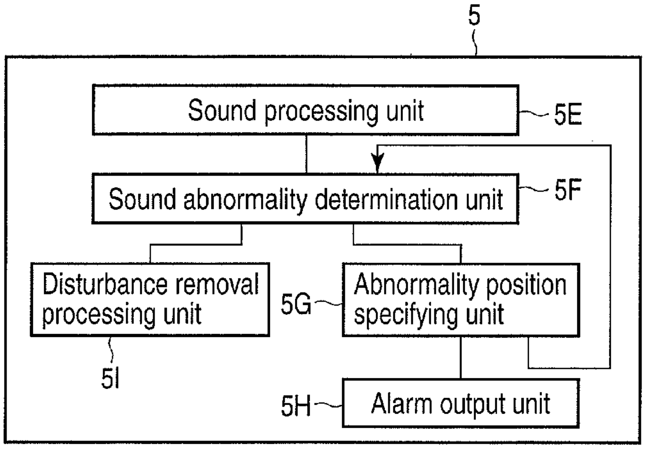
FIG. 11 is a block diagram showing an example of a signal processing unit in the conveyor diagnostic device according to the third embodiment.

As shown in FIG. 11, the signal processing unit 5 functionally includes a sound processing unit 5E acquiring sound for a predetermined number of revolutions of the conveyor 10, a sound abnormality determination unit 5F determining a presence/absence of an abnormality in the sound acquired by the sound processing unit 5E by comparing a acquired sound level with a predetermined normal sound level, an abnormality position specifying unit 5G specifying an abnormality occurrence position upon determining an abnormality in an acquired sound level and determining a presence of a deterministic abnormality in the conveyor 10 upon determining abnormalities in acquired sound each of the predetermined number of revolutions, an alarm output unit 5H, and a disturbance removal processing unit 5I determining the accidental occurrence of a disturbance upon determining that acquired sound is abnormal in only one or two revolutions and execute disturbance removal processing.

An operation of the conveyor diagnostic device 1 according to the third embodiment will be described next.

Figure 12:
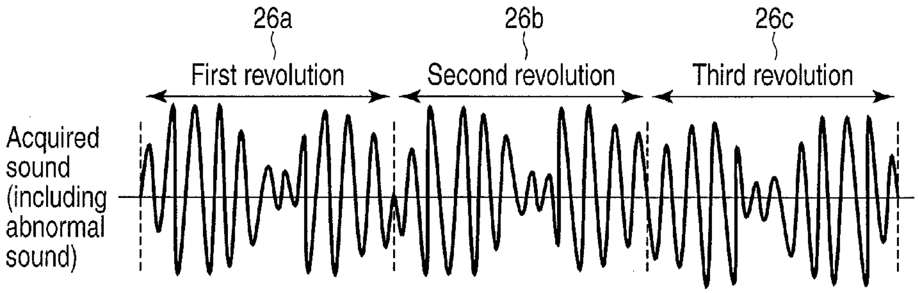
FIG. 12 is a graph showing an example of a changing state of an acquired sound level throughout the predetermined number of revolutions at a time of a diagnosis of the conveyor.
Figure 13:
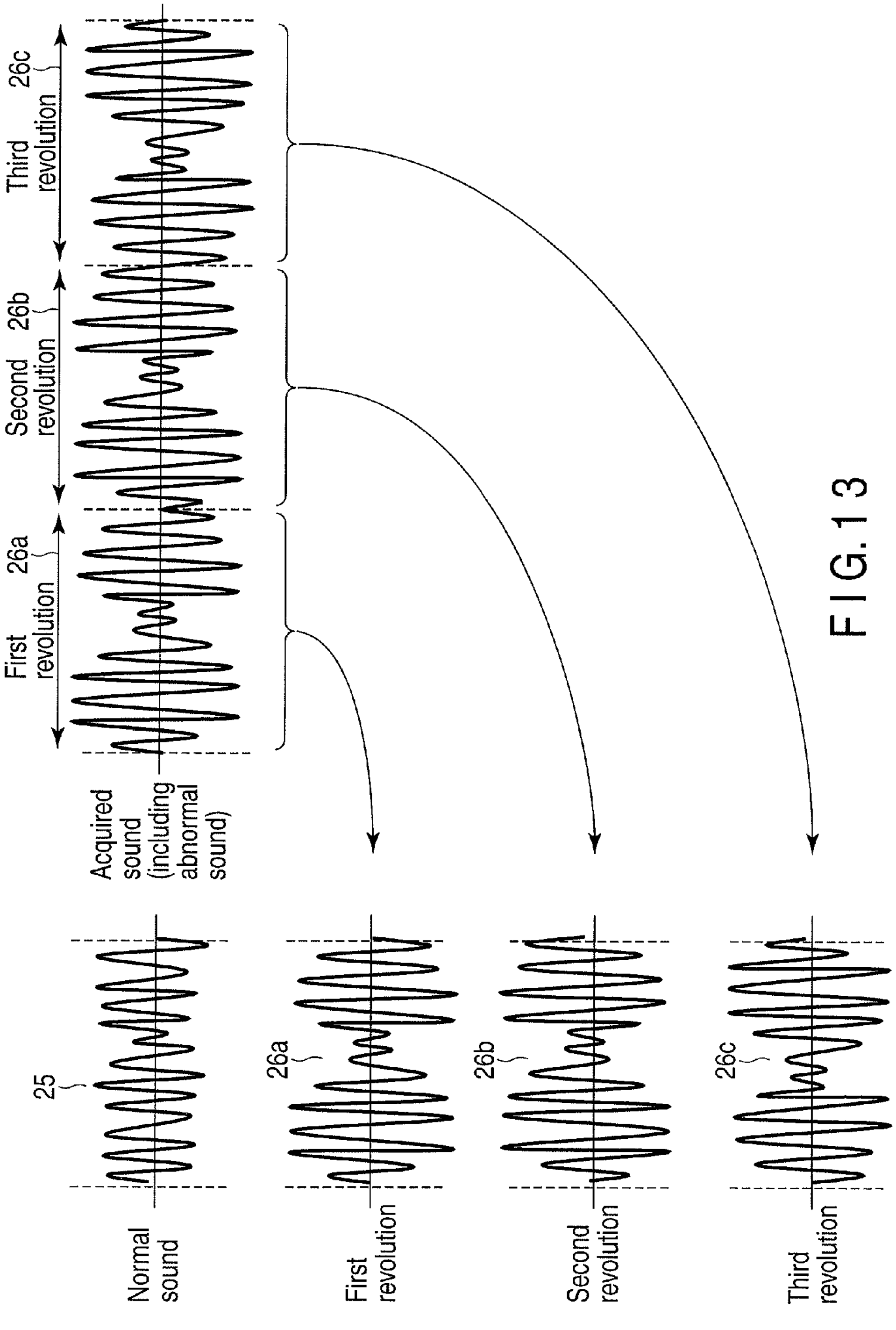
FIG. 13 is a chart showing an example of how an acquired sound level is divided for each revolution of the conveyor.

The conveyor diagnostic device 1 may store normal sound levels 25*a*, 25*b*, and 25*c* (see FIG. 10) throughout a predetermined number of revolutions of the conveyor 10 during normal operation and then compare the normal sound levels 25*a*, 25*b*, and 25*c* in the respective revolutions with acquired sound levels 26*a*, 26*b*, and 26*c* (see FIG. 12) in the respective revolutions of the conveyor 10 to determine the presence/absence of abnormalities in the acquired sound levels 26*a*, 26*b*, and 26*c* for the predetermined number of revolutions. Alternatively, the conveyor diagnostic device 1 may store a normal sound level (see FIG. 13) in one revolution of the conveyor 10 for the normal operation in advance, acquire sound for a predetermined number of revolutions of the conveyor 10, and determine the presence/absence of abnormalities in the acquired sound levels 26*a* to 26*c* for the predetermined number of revolutions based on the normal sound level in one revolution.

Note that in either of these cases, if the number of times of detection of abnormality in acquired sound is less than the predetermined number of revolutions, the abnormality is determined as a disturbance which has accidentally occurred. If acquired sound is abnormal consecutively throughout the predetermined number of revolutions, the conveyor diagnostic device 1 determines the abnormality as a deterministic abnormality in the conveyor 10.

Figure 14:
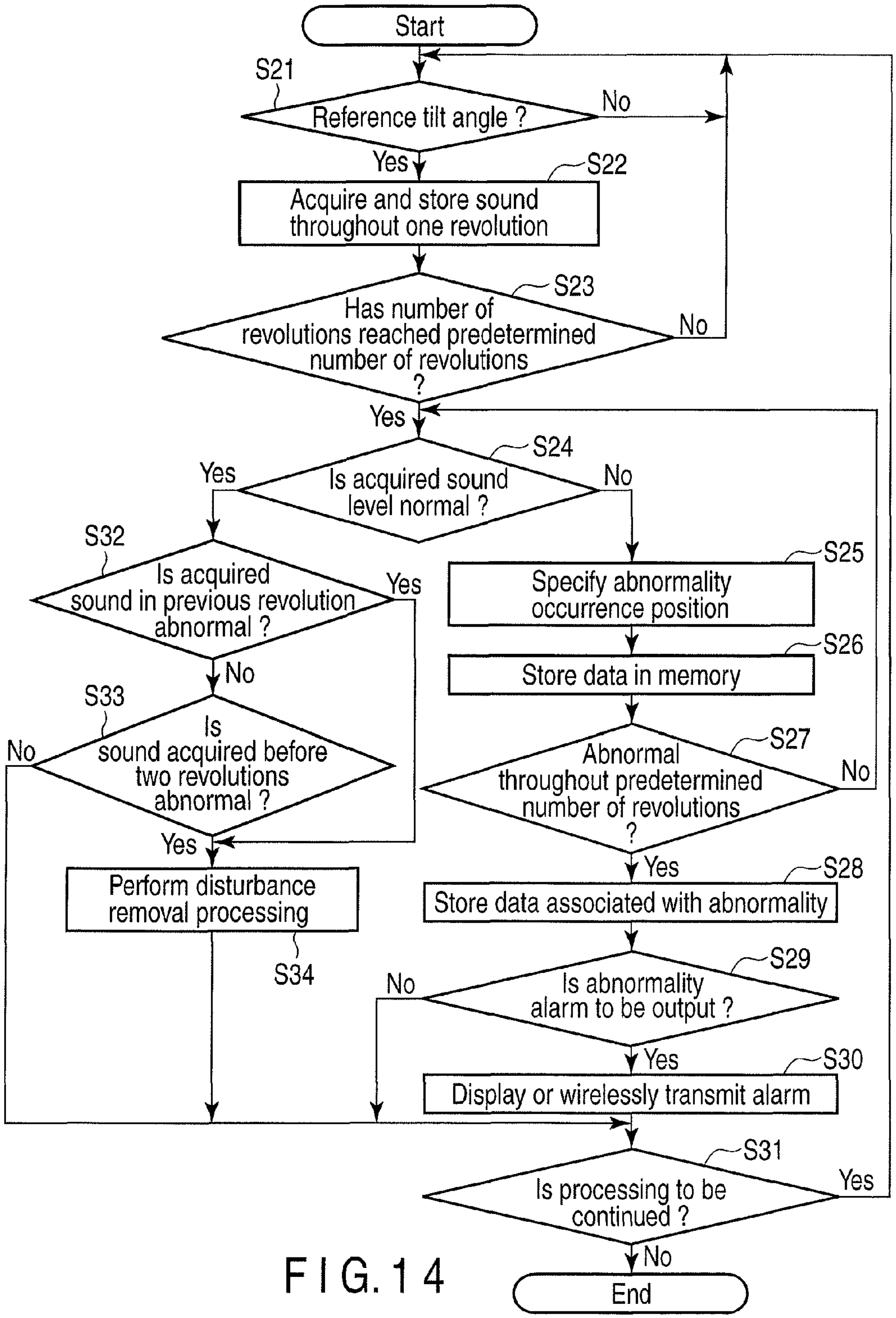
FIG. 14 is a flowchart showing an example of an operation of the signal processing unit according to the third embodiment shown in FIG. 1.

An example of the latter case, i.e., the processing of acquiring sound throughout a predetermined number of revolutions of the conveyor 10 and then determining the presence/absence of an abnormality in the acquired sound, will be described below with reference to FIG. 14.

At first, the signal processing unit 5 acquires the tilt angles detected by the tilt sensors 2*a* and 2*b* as in the first and second embodiments, and executes the sound processing unit 5E. The sound processing unit 5E acquires sound using the microphone 21 during the circulatory movement of the conveyor 10. At this time, the sound processing unit 5E determines, based on the vertical tilt angle detected by the tilt sensor 2*a*, whether the tilt angle has reached a tilt angle as a predetermined synchronization reference (for example, 90° in FIG. 2) (S21). The sound processing unit 5E sequentially receives the acquired environmental sound level 26*a* throughout a first revolution of the conveyor 10 from the microphone 21 at the timing when the tilt angle has changed the tilt angle as the synchronization reference, and stores the acquired data in the data memory 4 (S22).

The sound processing unit 5E determines whether it has received acquired sound levels throughout a predetermined number of revolutions (for example, three revolutions) (S23). If the number of revolutions has not reached the predetermined number of revolutions, the process shifts to step S21 to sequentially receive the acquired sound levels 26*b* and 26*c* in second and third revolutions of the conveyor 10 and store the received data in the data memory 4 (S22).

If the sound processing unit 5E determines that the number of revolutions of the conveyor 10 has reached the predetermined number of revolutions (for example, three revolutions), the signal processing unit 5 executes the sound abnormality determination unit 5F.

The sound abnormality determination unit 5F extracts the acquired sound level 26*a* in the first revolution from the data memory 4, and compares the acquired sound level in the first revolution with a preset normal sound level 25 (see FIG. 13) of the conveyor during normal operation to determine whether the acquired sound level is normal (S24). If the acquired sound level exceeds a predetermined allowable level range in comparison with the normal sound level, the sound abnormality determination unit 5F determines the occurrence of an acquired sound level abnormality, and sets an abnormality flag in a flag set area for a corresponding revolution (for example, the first revolution) in a proper memory, e.g., the memory 3. The signal processing unit 5 then executes the abnormality position specifying unit 5G.

The abnormality position specifying unit 5G refers to the tilt angle/position table 3-1 or the section-specific movement time table 3-2 (including the tables 3-2*a* to 3-2*d*) in the set data memory 3, based on the vertical tilt angle detected by the tilt sensor 2*a* when it is determined that the acquired sound level 25*a* in the first revolution is abnormal, to specify an abnormality occurrence position on the conveyor 10 (S25). The abnormality position specifying unit 5G then stores the abnormality occurrence position data in the data memory 4 (S26).

The abnormality position specifying unit 5G determines based on the abnormality flag set in a flag set area in the memory 3 whether the number of revolutions of the conveyor has reached the predetermined number of revolutions (S27), i.e., whether the abnormality flag is kept set throughout the predetermined number of revolutions. If the number of revolutions of the conveyor has not reached the predetermined number of revolutions, the process shifts to step S24, in which the signal processing unit 5 executes the sound abnormality determination unit 5F.

Upon determining that the acquired sound levels 26*b* and 26*c* in the second and third revolutions are also abnormal, the signal processing unit 5 determines in step S27 that the abnormality is a deterministic abnormality. The signal processing unit 5 then receives various kinds of data associated with abnormality occurrence position specifying operation and stores the data in the data memory 4 (S28).

Subsequently, the alarm output unit 5H determines whether to output an abnormality alarm (S29). If a flag to output an alarm is set, the alarm output unit 5H displays an abnormality alarm on the display unit (not shown) of the conveyor diagnostic device 1, or wirelessly transmits an abnormality alarm to the external monitoring device if the alarm output unit 5H is wirelessly connected to the external monitoring device (S30). If the processing is to be continued (S31), the process shifts to step S1 to repeatedly execute the same processing.

Upon determining in step S24 that the acquired sound level is normal, the signal processing unit 5 sets a normal flag in a flag set area for the corresponding revolution (e.g., the second revolution) of the memory 3 described above, and executes the disturbance removal processing unit 5I.

If it is determined in step S24 that the acquired sound level is normal, the disturbance removal processing unit 5I determines from the flag set in the flag set area in the memory 3 whether the acquired sound level in the previous revolution is abnormal (S32). If the acquired sound level in the previous revolution is normal, the disturbance removal processing unit 5I determines whether the sound level acquired before two revolutions is abnormal (S33). If the sound level acquired before one or two revolutions is abnormal, the disturbance removal processing unit 5I determines that the abnormality in the sound level acquired before one or two revolutions is based on the occurrence of a disturbance, and executes disturbance removal processing (S34). For example, the disturbance removal processing unit 5I replaces the abnormality flag in the flag set area for the previous revolution with a normal flag.

According to the third embodiment, therefore, the conveyor diagnostic device 1 determines the presence/absence of an abnormality based on the acquired sound level in each revolution of the conveyor 10. If an acquired sound level accidentally becomes abnormal, the conveyor diagnostic device 1 regards the accidental acquired sound level as a disturbance. If acquired sound levels are consecutively abnormal throughout a predetermined number of revolutions, the conveyor diagnostic device 1 determines that a deterministic abnormality has occurred on the conveyor 10. The conveyor diagnostic device 1 then specifies an abnormality occurrence position and outputs an abnormality alarm as needed. The third embodiment can therefore accurately specify the position where abnormal sound is generated.

(Modification of Third Embodiment)

Figure 15:
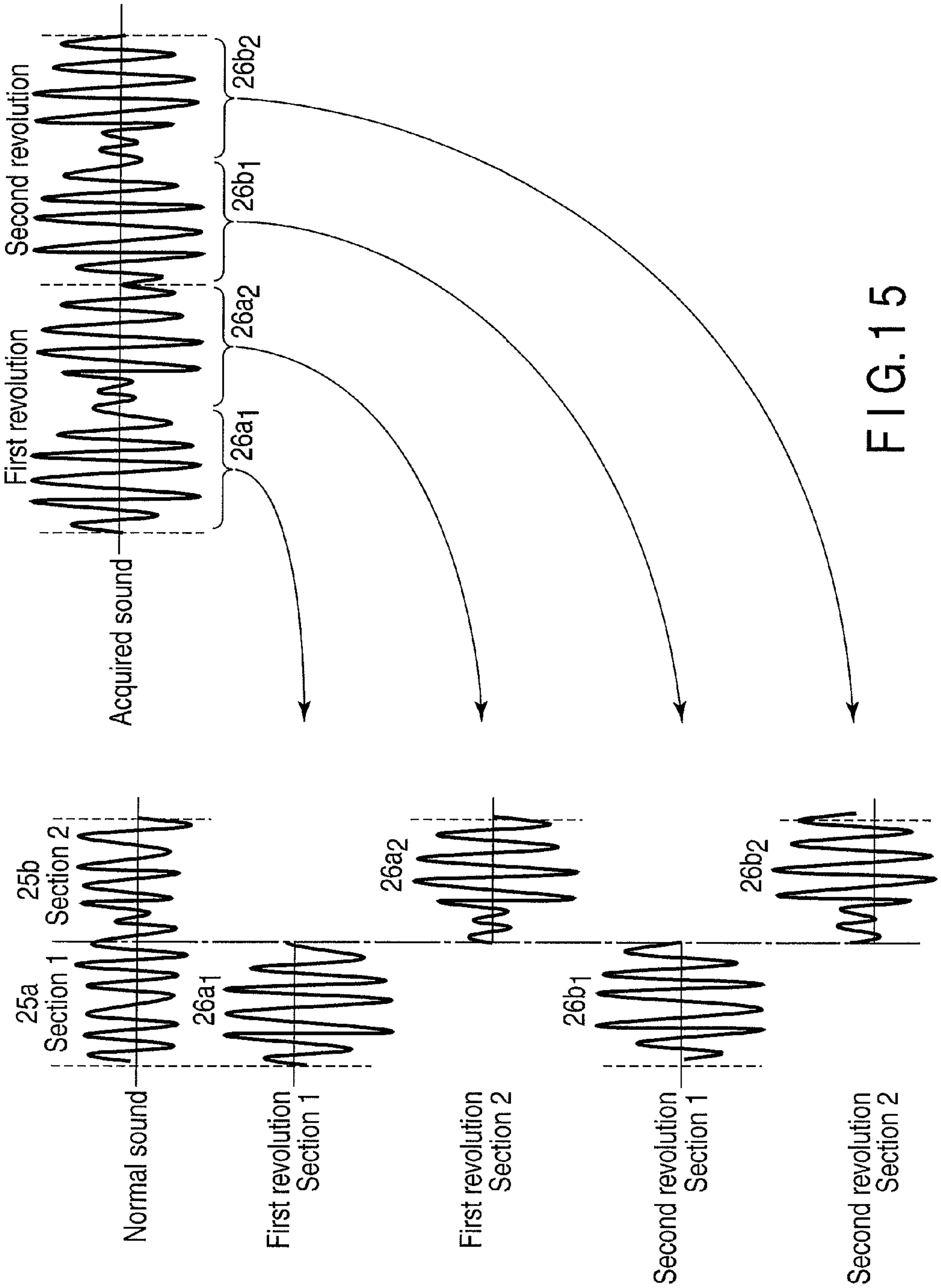
FIG. 15 is a chart showing an example of how an acquired sound level corresponding to one revolution of the conveyor is divided into a plurality of sections.

(1) According to the third embodiment described above, the conveyor diagnostic device 1 determines the presence/absence of an abnormality in acquired sound for each revolution. However, for example, as shown in FIG. 15, one revolution of the conveyor 10 during normal operation may be divided into two sections, e.g., section 1 including the lower turnaround section 13*a* after the tilt angle reaches 90° and the conveyor upper surface section 13*b* and section 2 including the upper turnaround section 13*c* and the conveyor lower surface section 13*d*. The conveyor diagnostic device 1 then acquires the normal sound levels 25*a* and 25*b* from the microphone 21 and stores the normal sound levels 25*a* and 25*b* in the memory 3 or 4.

Subsequently, the microphone 21 acquires sound throughout two revolutions. The conveyor diagnostic device 1 then compares divided acquired sound levels 26*a*1, 26*a*2, 26*b*1, and 26*b*2 in sections 1 and 2 of each revolution with the normal sound levels 25*a* and 25*b* in sections 1 and 2. The conveyor diagnostic device 1 may determine the presence/absence of an abnormality in acquired sound upon dividing one revolution into two sections 1 and 2.

(2) In the third embodiment described above, the signal processing unit 5 detects a horizontal tilt angle using the tilt sensor 2*b*. The signal processing unit 5 monitors the tilt angle detected by the tilt sensor 2*b*. If, for example, the tilt angle does not exceed the upper or lower management limit value, i.e., it is determined that there is no abnormality, the signal processing unit 5 may stop supplying power from the power supply unit 6 to the microphone 21 to reduce the power consumption, thereby allowing the long-term use of the power supply unit 6 or prolong its service life.

(Fourth Embodiment)

Figure 16:
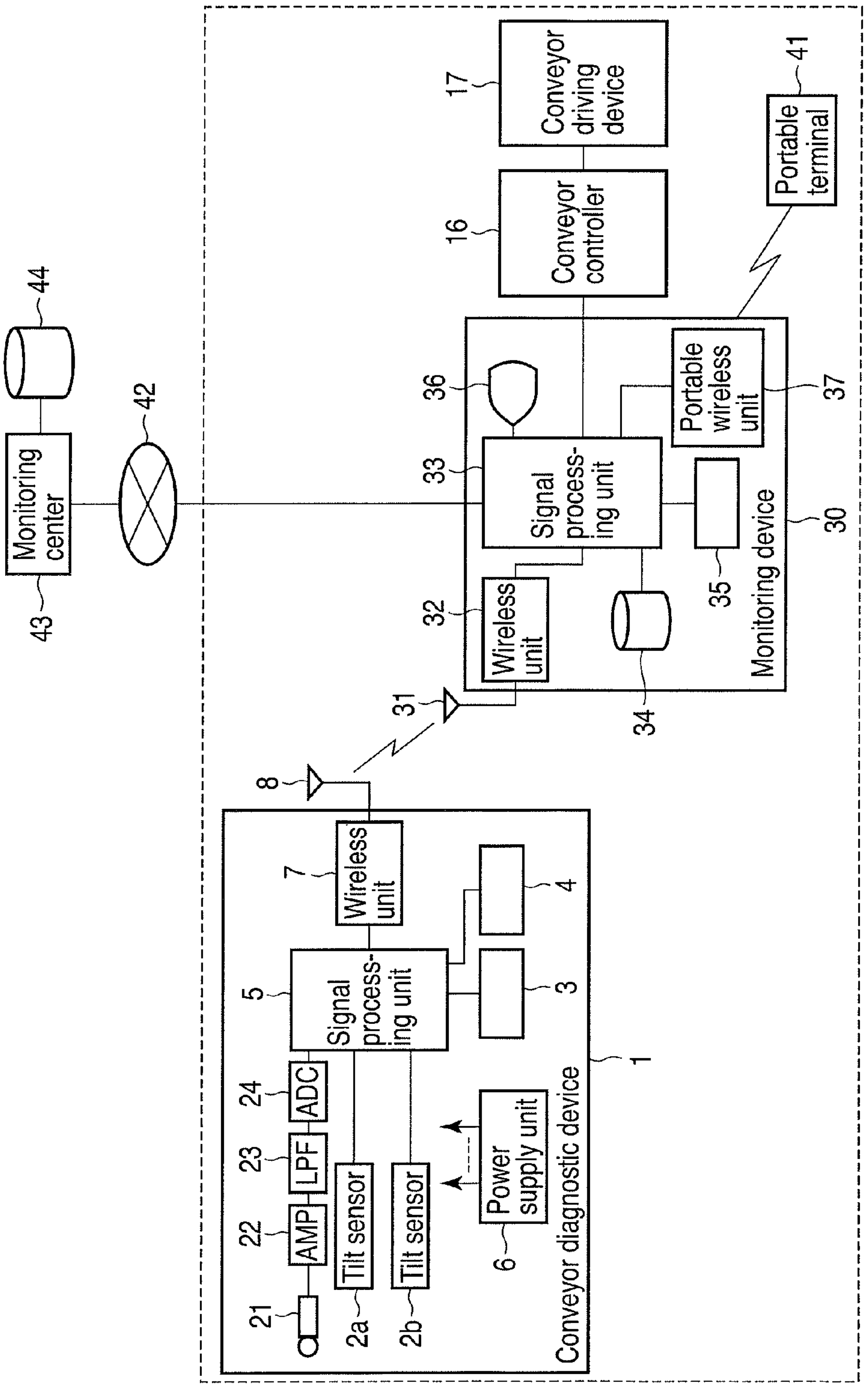
FIG. 16 is a block diagram showing an example of a structure of a conveyor diagnostic system according to a fourth embodiment.

FIG. 16 is a block diagram showing an example of a structure of a conveyor diagnostic system according to a fourth embodiment.

The conveyor diagnostic system includes the conveyor diagnostic device 1 shown in FIG. 1, a monitoring device 30, and a conveyor controller 16 and conveyor driving device 17 which drive a conveyor 10 in accordance with a control instruction from the monitoring device 30.

The monitoring device 30 receives the data acquired from tilt sensors 2*a* and 2*b* and a microphone 21 by the conveyor diagnostic device 1 for a long period of time, and executes detection of a symptom of failure and detailed inspection associated with the conveyor 10.

The monitoring device 30 includes a transmission/reception antenna 31, a wireless unit 32, a signal processing unit 33 formed by a CPU, a database 34, a set data memory 35 corresponding to a memory 3, and a display unit 36.

A signal processing unit 5 of the conveyor diagnostic device 1 transmits the tilt angles and acquired sound level acquired by the tilt sensors 2*a* and 2*b* and the microphone 21 to the monitoring device 30 via a wireless unit 7 and an antenna 8. Note that the conveyor diagnostic device 1 may automatically transmit such data by using a time zone in which no passenger uses the conveyor 10, e.g., at late night or early morning, or may transmit such data in a time zone in which passengers use the conveyor 10 based on a transmission instruction from an operator.

When an abnormality occurrence position is specified, the signal processing unit 5 of the conveyor diagnostic device 1 may transmit abnormality alarm data including various kinds of data associated with the abnormality occurrence position specifying operation to the monitoring device 30 via the wireless unit 7 and the antenna 8 in accordance with an alarm output flag.

The signal processing unit 33 of the monitoring device 30 receives various kinds of data transmitted from the conveyor diagnostic device 1 via the antenna 31 and the wireless unit 32, and stores the data in the database 34. The database 34 therefore stores short-term data, long-term data, and the like acquired by the tilt sensors 2*a* and 2*b* and the microphone 21, in addition to various kinds of data associated with abnormality occurrence position specifying operation.

In the set data memory 35, symptom determination data necessary to determine a symptom of failure on the conveyor 10, i.e., data at a stage prior to a failure, are set, including, for example, upper and lower limit allowable values that do not reach upper and lower management limit values 14*u* and 14*d*, an acquired sound symptom level representing a symptom of abnormality, and an acquired sound symptom frequency. In addition, the following tables are set in the set data memory 35: a tilt angle/position table 3-1 (see FIG. 4), a section-specific movement time table 3-2, and elapsed time/position tables 3-2*a* to 3-2*d* (see FIGS. 8 and 9) corresponding to the respective sections.

The signal processing unit 33 of the monitoring device 30 comprehends transitional changes in the horizontal tilt angle detected by the tilt sensor 2*b* and the acquired sound level obtained from the microphone 21. If the horizontal tilt angle data detected by the tilt sensor 2*b* reaches the upper or lower limit allowable value or the acquired sound level obtained from the microphone 21 reaches the acquired sound symptom level, the acquired sound symptom frequency, or the like, the signal processing unit 33 determines that there is a symptom of failure.

Upon determining that there is a symptom of failure, the signal processing unit 33 refers to the tilt angle/position table 3-1, the section-specific movement time table 3-2, or the like, based on the vertical tilt angle detected by the tilt sensor 2*a* at this point of time, to specify a symptom occurrence position, and displays data representing a symptom of failure, a failure symptom occurrence position, and the like on the display unit 36 of the monitoring device 30.

A surveillant checks failure symptom data and then sends out a movement control instruction to the conveyor controller 16 to move to the symptom occurrence position of a specific step 11A in a period during which there is no passenger on the conveyor 10 or while limiting the use of the conveyor 10 by passengers.

The conveyor controller 16 drives the conveyor driving device 17 based on the movement control instruction to move the specific step 11A, to which the tilt sensors 2*a* and 2*b*, the microphone 21, and the like are attached, to the symptom occurrence position.

In this case, the signal processing unit 33 stops the specific step 11A near the symptom occurrence position using the conveyor driving device 17, and then reciprocates the specific step 11A near the symptom occurrence position a plurality of number of times at a low speed, thereby acquiring detailed state data near the symptom occurrence position by the tilt sensors 2*a* and 2*b* and the microphone 21. The signal processing unit 33 transmits the data to the monitoring device 30 via the conveyor diagnostic device 1, stores the data in the database 34, and displays the data on the display unit 36.

Assume that the signal processing unit 33 determines, based on the horizontal tilt angle detected by the tilt sensor 2*b* and the acquired sound level obtained from the microphone 21, that the conveyor 10 is stably revolving. In this case, the signal processing unit 33 transmits an instruction to stop data acquisition from the tilt sensor 2*b* and the microphone 21 throughout a predetermined period to the signal processing unit 5 of the conveyor diagnostic device 1, or transmits an instruction to stop power supply from the power supply unit 6 to the tilt sensor 2*b* and the microphone 21, thereby prolonging the service life of the power supply unit 6 such as a battery.

Upon receiving an instruction to stop data acquisition from the tilt sensor 2*b* and the microphone 21, the signal processing unit 5 may supply power from the power supply unit 6 such as a battery to the microphone 21 to acquire sound near the conveyor moving in the conveyor upper surface section 13*b* during a predetermined period of time when the tilt sensor 2*a* detects a tilt angle as a synchronization reference (for example, 90° as described above).

Note that the power supply unit 6 such as a battery supplies power to the tilt sensor 2*b* and the microphone 21 at, for example, the timing when a predetermined stable operation period of the conveyor 10 has elapsed. Alternatively, the power supply unit 6 such as a battery supplies power to the devices at predetermined intervals in a stable operation period, and resumes continuous power supply upon determining the occurrence of a symptom of failure.

In the fourth embodiment, therefore, upon detecting a symptom of failure on the conveyor 10, the conveyor diagnostic system moves the specific step 11A to a position near the symptom occurrence position using the conveyor driving device 17, and causes the specific step 11A to reciprocate a plurality of number of times at a low speed. The tilt sensors 2*a* and 2*b* and the microphone 21 acquire detailed state data about a position near the symptom occurrence position. The detailed state data is transmitted to the monitoring device 30 via the conveyor diagnostic device 1. This makes it possible to perform detailed inspection for a symptom of failure on the conveyor 10 by using the monitoring device 30.

If there is no symptom of failure, it is possible to prolong the service life of the power supply unit 6 by selectively stopping power supply from the power supply unit 6 such a battery throughout a predetermined period of time.

The conveyor diagnostic system in FIG. 16 includes a portable wireless unit 37 inside the monitoring device 30, and transmits and receives data between the monitoring device 30 and a portable terminal 41, in accordance with access from the portable terminal 41 held by an inspector or the like. The monitoring device 30 is connected to a monitoring center 43 via a network 42 such as a LAN or WAN.

(Fifth Embodiment)

Figure 17:
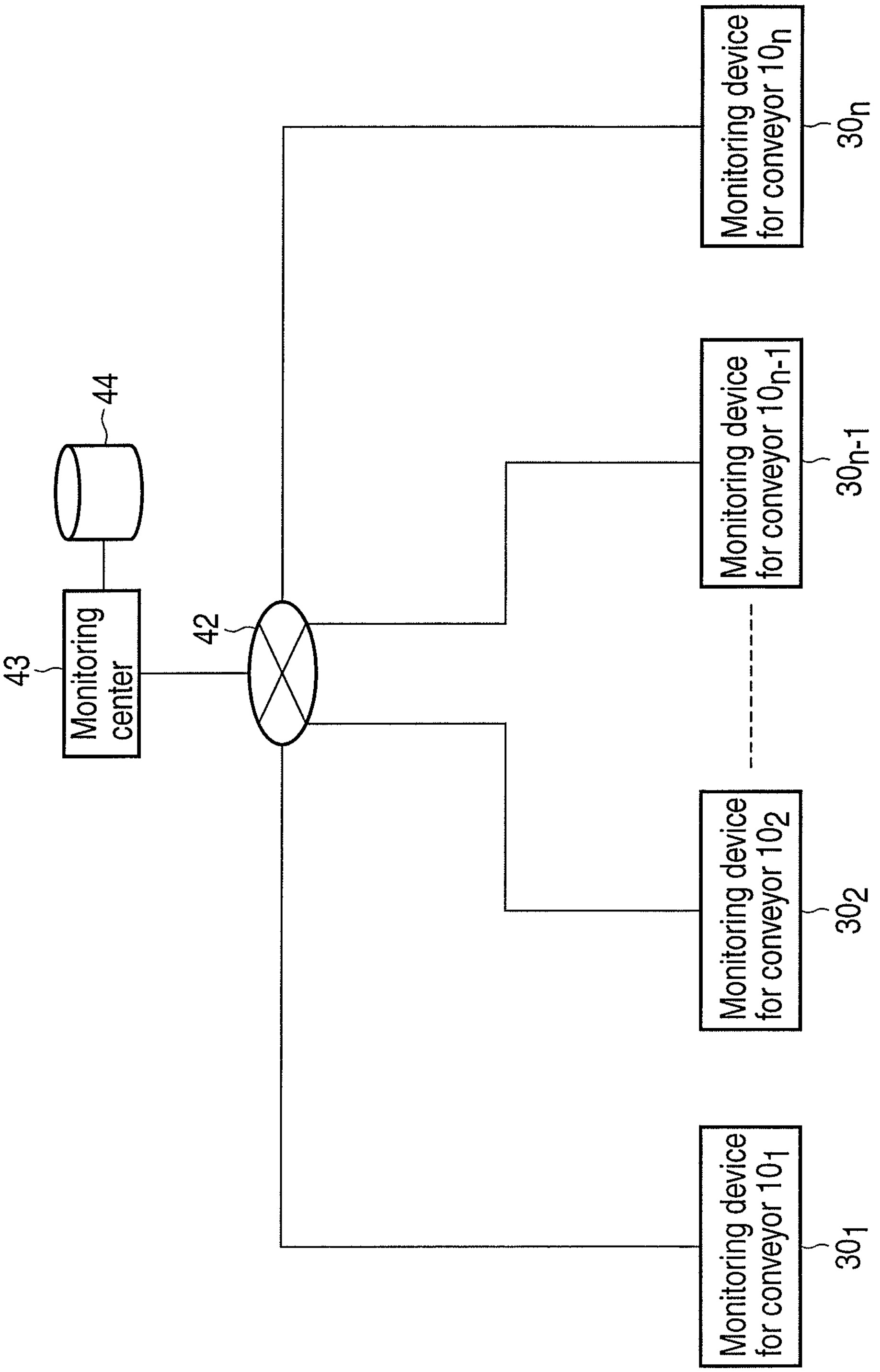
FIG. 17 is a block diagram showing an example of a structure of a conveyor diagnostic system according to a fifth embodiment.

FIG. 17 is a block diagram showing an example of a structure of a conveyor diagnostic system according to the fifth embodiment.

As shown in FIG. 17, the monitoring center 43 includes a database 44, and is connected to monitoring devices $\mathbf{30}_1$, $\mathbf{30}_2$, . . . , $\mathbf{30}_n$ to monitor conveyors $\mathbf{10}_1$, $\mathbf{10}_2$, . . . , $\mathbf{10}_n$ via a network 42.

The database 44 receives and stores various kinds of data detected by tilt sensors 2*a* and 2*b* and a microphone 21 and stored in databases 34 of the monitoring devices $\mathbf{30}_1$, $\mathbf{30}_2$, . . . , $\mathbf{30}_n$. The database 44 stores data such as installation times and model names of the conveyors $\mathbf{10}_1$, $\mathbf{10}_2$, . . . , $\mathbf{10}_n$ installed in the respective places, and operation periods in which symptoms of failure will appear.

The portable terminal 41 held by the inspector or the like accesses an arbitrary monitoring device, e.g., the monitoring device $\mathbf{30}_1$, and sends an acquired data transmission request to a signal processing unit 33 via a portable wireless unit 37. The signal processing unit 33 reads out the data acquired for a predetermined period of time, e.g., one week, from the database 34 and transmits the data to the portable terminal 41 via the portable wireless unit 37. The portable terminal 41 receives and stores the data transmitted from a monitoring device, e.g., the monitoring device $\mathbf{30}_1$, and monitors an operation state of the conveyor $\mathbf{10}_1$. The portable terminal 41 then stores the data in a database in, for example, an inspection center or maintenance center (not shown) for each conveyor corresponding to each monitoring device, as needed.

The monitoring center 43 reads out various kinds of data acquired by the tilt sensors 2*a* and 2*b* and the microphone 21 corresponding to each of the monitoring devices $\mathbf{30}_1$, $\mathbf{30}_2$, . . . , $\mathbf{30}_n$ and stored in the database 44 and other necessary data. The monitoring center 43 then displays, on the display unit, for example, at what speeds the conveyors $\mathbf{10}_1$, $\mathbf{10}_2$, . . . , $\mathbf{10}_n$ are revolving, in which directions they are revolving, and whether any data associated with the occurrence of an abnormality has been received, and monitors the operation states of the conveyors $\mathbf{10}_1$, $\mathbf{10}_2$, . . . , $\mathbf{10}_n$. Upon receiving a notification of a symptom of failure on the conveyor $\mathbf{10}_1$ from an arbitrary monitoring device, e.g., the monitoring device $\mathbf{30}_1$, the monitoring center 43 selects data, of the data of the conveyors $\mathbf{10}_1$, $\mathbf{10}_2$, . . . stored in the database 44 and including installation times, model names, and the operation periods in which symptoms of failure will appear, which corresponds to the same model number and the same model installed at almost the same time. In addition, if there are other conveyors $\mathbf{10}_2$, . . . , $\mathbf{10}_n$ whose operation periods have reached the operation periods in which symptoms of failure will appear, the monitoring center 43 outputs inspection instructions to the monitoring devices $\mathbf{30}_2$, . . . , $\mathbf{30}_n$. In accordance with the inspection instructions, the monitoring devices execute coarse sensing first, and then perform fine sensing by, for example, decreasing the driving speeds. The monitoring center 43 causes the monitoring devices $\mathbf{30}_2$, . . . , $\mathbf{30}_n$ to transmit the obtained data to the monitoring center 43, thereby precisely checking other conveyors $\mathbf{10}_2$, . . . , $\mathbf{10}_n$ to determine whether there are any causes of abnormalities or symptoms of failure.

According to the fifth embodiment described above, the portable terminal 41 and the monitoring center 43 access an arbitrary monitoring device to receive various kinds of data acquired from the corresponding conveyor and monitor the operation state of the conveyor. Upon receiving a symptom of failure on a conveyor from an arbitrary monitoring device, the monitoring center 43 outputs inspection instructions to monitoring devices which monitor other conveyors which were installed in almost the same period and have the same model name, receives detailed data based on low-speed driving of the conveyors, and checks causes of abnormalities and symptoms of failure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A conveyor diagnostic device which diagnoses an abnormal state of a cyclically moving conveyor, the device comprising:

a first tilt sensor which is attached to a predetermined position of the conveyor and detects a tilt angle of the conveyor in a vertical direction;

a second tilt sensor which is attached to a predetermined position of the conveyor and detects a tilt angle of the conveyor in a horizontal direction;

a table indicating a relationship between a tilt angle which changes in the vertical direction and a plurality of sections included in one revolution of the conveyor to which the first tilt sensor and the second tilt sensor are attached; and a signal processing unit which specifies an abnormality occurrence position of the conveyor based on a tilt angle in the vertical direction detected by the first tilt sensor, the table, and an elapsed time after ingression for a section corresponding to the tilt angle in the vertical direction, when a tilt angle in the horizontal direction detected by the second tilt sensor exceeds a predetermined management limit value.

2. The conveyor diagnostic device according to claim 1, wherein the table includes a relationship between a tilt angle which changes in the vertical direction, the section, and a individual position in the section corresponding to a elapsed time from a tilt angle change point indicating the ingression for the section, and the signal processing unit specifies an abnormality occurrence position in an arbitrary section based on a time elapsed from a tilt angle change point indicating a ingression for an arbitrary section corresponding to the tilt angle in the vertical direction detected by the first tilt sensor, and an individual position in the arbitrary section in the table.

3. The conveyor diagnostic device according to claim 2, wherein the signal processing unit determines a speed abnormality of a conveyor driving unit for the arbitrary section when a transit time of the conveyor for the arbitrary section differs from a transit time for the arbitrary section which is set in the table.

4. The conveyor diagnostic device according to claim 1, wherein the signal processing unit estimates a tilt angle which changes for movement from a current section to a next section, based on the tilt angle in the vertical direction and the table, and removes the tilt angle detected by the first tilt sensor as occurrence of a disturbance when a difference between the tilt angle detected by the first tilt sensor and the estimated tilt angle exceeds a predetermined range.

5. A conveyor diagnostic system including the conveyor diagnostic device according to claim 1, wherein the conveyor diagnostic device further comprises a first wireless unit which wirelessly transmits a tilt angle signal in the vertical direction detected by the first tilt sensor and a tilt angle signal in the horizontal direction detected by the second tilt sensor, and the system comprises a monitoring device which receives, the tilt angle signal in the vertical direction and the tilt angle signal in the horizontal direction which are transmitted from the conveyor diagnostic device by using a second wireless unit, and detects and displays a failure symptom position of the conveyor based on the tilt angle signal in the vertical direction and the tilt angle signal of the horizontal direction and predetermined data for a symptom determination.

6. The conveyor diagnostic system according to claim 5, wherein the monitoring device is connected to a conveyor driving device via a conveyor controller, and the monitoring device sends an instruction to move the conveyor to the conveyor driving device via the conveyor controller to move the conveyor, to which the first tilt sensor and the second tilt sensor are attached, to the failure symptom position and to reciprocate the conveyor near the failure symptom position a plurality of number of times at a low speed, and receives detailed inspection data from the first tilt sensor and the second tilt sensor.

7. The conveyor diagnostic system according to claim 5, wherein the monitoring device transmits a power supply stop instruction to the conveyor diagnostic device in a predetermined stable operation period of the conveyor, stops supplying power from a power supply unit of the conveyor diagnostic device to the first tilt sensor and the second tilt sensor, causes the power supply unit to supply power to the first tilt sensor and the second tilt sensor in a predetermined period after an elapse of the stable operation period or in the stable operation period, and causes the power supply unit to intermittently supply power to the first tilt sensor and the second tilt sensor when it is determined that there is a symptom of failure.

8. The conveyor diagnostic system according to claim 5, further comprising a monitoring center which is connected to the plurality of monitoring devices via a network, wherein the monitoring center manages model names and installation times of conveyors which the monitoring devices respectively monitor, monitors operation states of the conveyors based on tilt angle signals in the vertical direction and the horizontal direction which are detected by the first tilt sensor and the second tilt sensor and received from the monitoring devices, and monitors another conveyor having the same model name or same installation time as a model name or installation time of a specific conveyor when occurrence of an abnormality in the specific conveyor is detected, and transmits an instruction to inspect the same abnormality as the abnormality in the specific conveyor to a monitoring device corresponding to the other conveyor.

* * * * *